Nov. 21, 1967 A. G. BODOH ET AL 3,353,882

PHONOGRAPH RECORD STORAGE ARRANGEMENT

Filed June 8, 1966 3 Sheets-Sheet 1

INVENTORS
ALBINUS G. BODOH
DANIEL J. SIWY
BY
[signature]
ATTY.

PHONOGRAPH RECORD STORAGE ARRANGEMENT

Filed June 8, 1966 3 Sheets-Sheet 2

INVENTORS
ALBINUS G. BODOH
DANIEL J. SIWY
BY

Nov. 21, 1967 A. G. BODOH ET AL 3,353,882
PHONOGRAPH RECORD STORAGE ARRANGEMENT
Filed June 8, 1966 3 Sheets-Sheet 3
FIG. 3
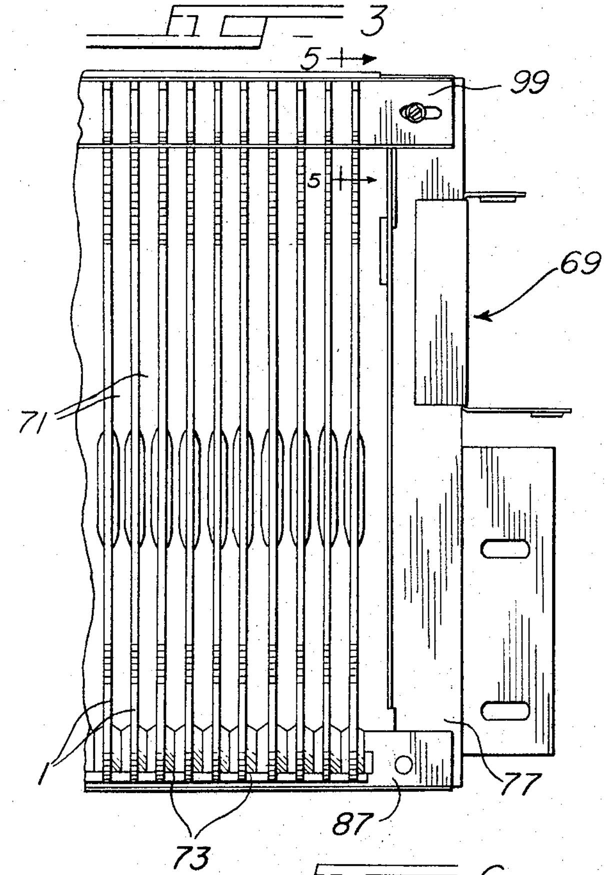
FIG. 4
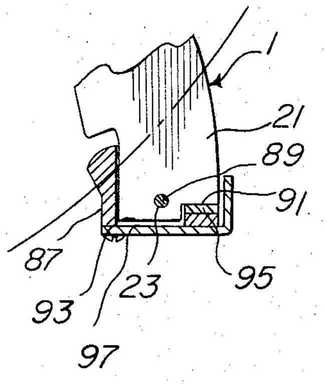
FIG. 5
FIG. 6
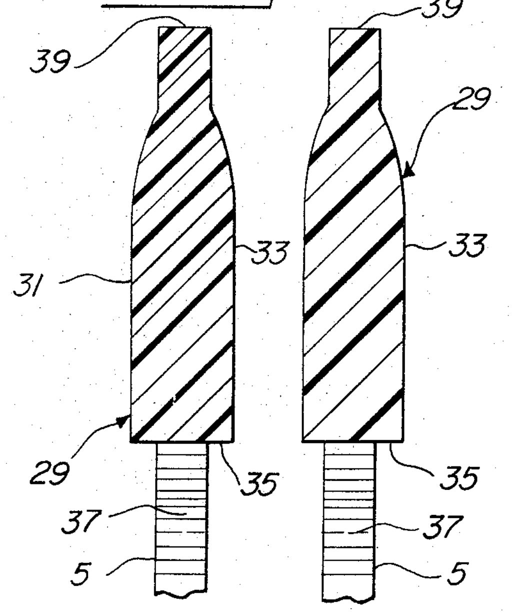
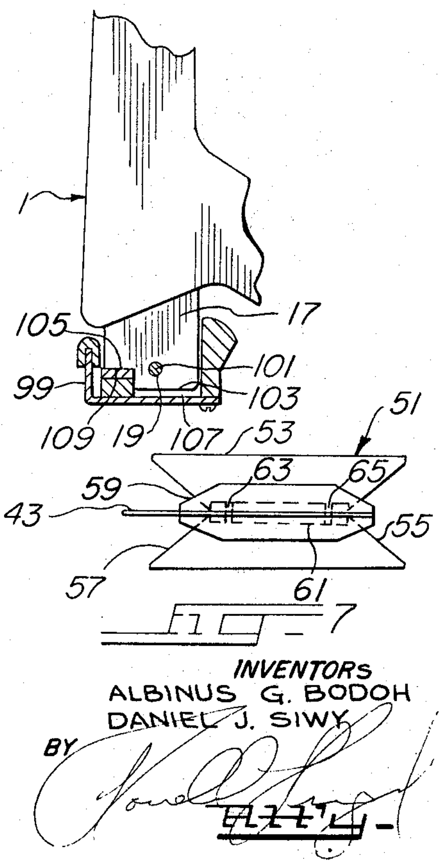
FIG. 5, FIG. 7
INVENTORS
ALBINUS G. BODOH
DANIEL J. SIWY
BY
ATT'Y United States Patent Office 3,353,882
Patented Nov. 21, 1967

3,353,882
PHONOGRAPH RECORD STORAGE ARRANGEMENT

Albinus G. Bodoh, Prospect Heights, and Daniel J. Siwy, Glenview, Ill., assignors to The Seeburg Corporation, Chicago, Ill., a corporation of Delaware Filed June 8, 1966, Ser. No. 556,139
7 Claims. (Cl. 312—10)

This invention relates generally to a record storage magazine for a phonograph, and more particularly this invention relates to improved record separators for a phonograph record storage magazine.

In a conventional commercial phonograph a large number of phonograph records are stored in a record storage area or magazine to provide the customer with a large variety of choices. Each record in the record storage magazine is positioned in a separate chamber of the magazine. Since the accurate fulfilling of a customer's choice depends upon having each record in its assigned chamber, a record must be returned to the appropriate chamber after it is played. This is normally achieved by only partially removing a record from the chamber during play of that record, i.e., a portion of the record remains between the separators forming a storage chamber for the record while the record is being played.

As a record is usually not perfectly flat (that is, many records are warped by mechanical bending and others are warped by temperature changes, etc.), it is necessary that the separators forming a storage chamber be relatively widely spaced so that the record will not be damaged by rubbing against the separators during play of the record. A relatively wide spacing of the separators is necessary because the presence of a warp in the record will cause the perimeter of the record to exhibit a relatively large deviation on either side of a center plane (the center plane being that which would be occupied by a perfectly flat record) as the record rotates, and the record will rub against the separators if they are not widely spaced. This wide spacing of the separators, of course, results in the storage magazine being relatively large for a given number of records.

In order to decrease the size of the storage magazine as much as possible, the separators are placed as close to each other as possible. To place the separators close to each other and yet prevent rubbing of the record against the separators during play of the record, the magazine separators have to be accurately machined to close tolerances, which results in the consumption of a relatively large amount of time and the expenditure of a relatively large amount of money in manufacture and assembly. Also, the separators have to be formed from a material which can be machined to close tolerances, such as the inflexible metals which are relatively expensive, and thus relatively large expenditures have to be made for material.

The present invention was evolved to form a compact, inexpensive record magazine. Briefly, in the preferred embodiment described herein, the invention provides a phonograph record storage magazine having record separators formed of inexpensive high impact plastic. These separators are formed in such a manner that a minimal amount of plastic is utilized without reducing the structural strength of the separators. Each of the separators is fixedly connected at two points adjacent the bottom of the storage magazine. The fixed connections of successive record separators are placed at equal intervals along the bottom of the magazine so that each individual separator is uniformly spaced from the separators on either side of it. The uniform spacing between separators is somewhat greater than the thickness of a record, but considerably less than the distance between separators required for playing a warped record that partially extends between the separators during play.

Each of the separators has an arcuate section that extends from a region adjacent the bottom of the storage magazine upwardly to a region adjacent the phonograph turntable. Near the end adjacent the turntable, a thickened portion is formed in the arcuate section of the separator. This thickened portion forms a protrusion on both of the major sides of the separator's arcuate section. The thickened portion is formed at the same location on each of the separators, so that when the separators are juxtaposedly stationed in the magazine the protrusions of contiguous separators are adjacent each other.

A pair of adjoining separators form a storage chamber for an individual record. When a record is to be removed from its storage chamber, or returned thereto, a transfer arm is utilized. The arm is provided with a transfer head member comprising a V-shaped groove formed to engage and support the record during movement into or out of the storage chamber. A spreader is positioned on the very end of the transfer arm, beyond the V-shaped groove, and forms a part of the transfer head member. The spreader is a solid member having tapered ends. During motion of the transfer arm, the spreader follows an arcuate path between the arcuate sections of adjoining separators, while the V-shaped groove follows a parallel arcuate path which is not between the arcuate sections. The transfer arm, when a record is being removed from the storage chamber to be placed on the phonograph turntable, completes an arc that takes the spreader beyond the protrusions on the pair of adjoining separators forming a storage chamber for the record. After the record has been placed on the turntable, the transfer arm is returned to a position such that the spreader is directly between the protrusions on the adjoining pair of separators. This forces the ends of the separators apart, so that the record being played has as much or more space than it would have with conventional separators that are positioned with a greater initial separation.

Accordingly, a primary object of this invention is to provide a smaller and more compact phonograph record storage magazine.

Another object of this invention is to provide a phonograph record storage magazine that is less expensive to produce than previous magazines.

A further object of this invention is to provide a smaller and more compact phonograph record storage magazine that does not require accurate machining of the individual record separators constituting the magazine.

Yet a further object of this invention is to provide a smaller and more compact phonograph record storage magazine that provides as much or more space for the playing of an individual record that partially extends into the magazine during play than conventional arrangements provide.

These and other objects, advantages, and features of the subject invention will hereinafter appear, and, for purposes of illustration, but not of limitation, an exemplary embodiment of the subject invention is shown in the appended drawings, in which:

FIGURE 3 is a fragmentary top view of a portion of the phonograph record storage magazine illustrated in FIGURE 2;

FIGURE 4 is an enlarged fragmentary sectional view taken along the line 4—4 of FIGURE 2;

FIGURE 5 is an enlarged fragmentary sectional view taken along the line 5—5 of FIGURE 3;

FIGURE 6 is an enlarged fragmentary sectional view taken along the line 6—6 of FIGURE 1; and FIGURE 7 is an enlarged top view of the transfer head taken along the line 7—7 of FIGURE 1.

Figure 1:
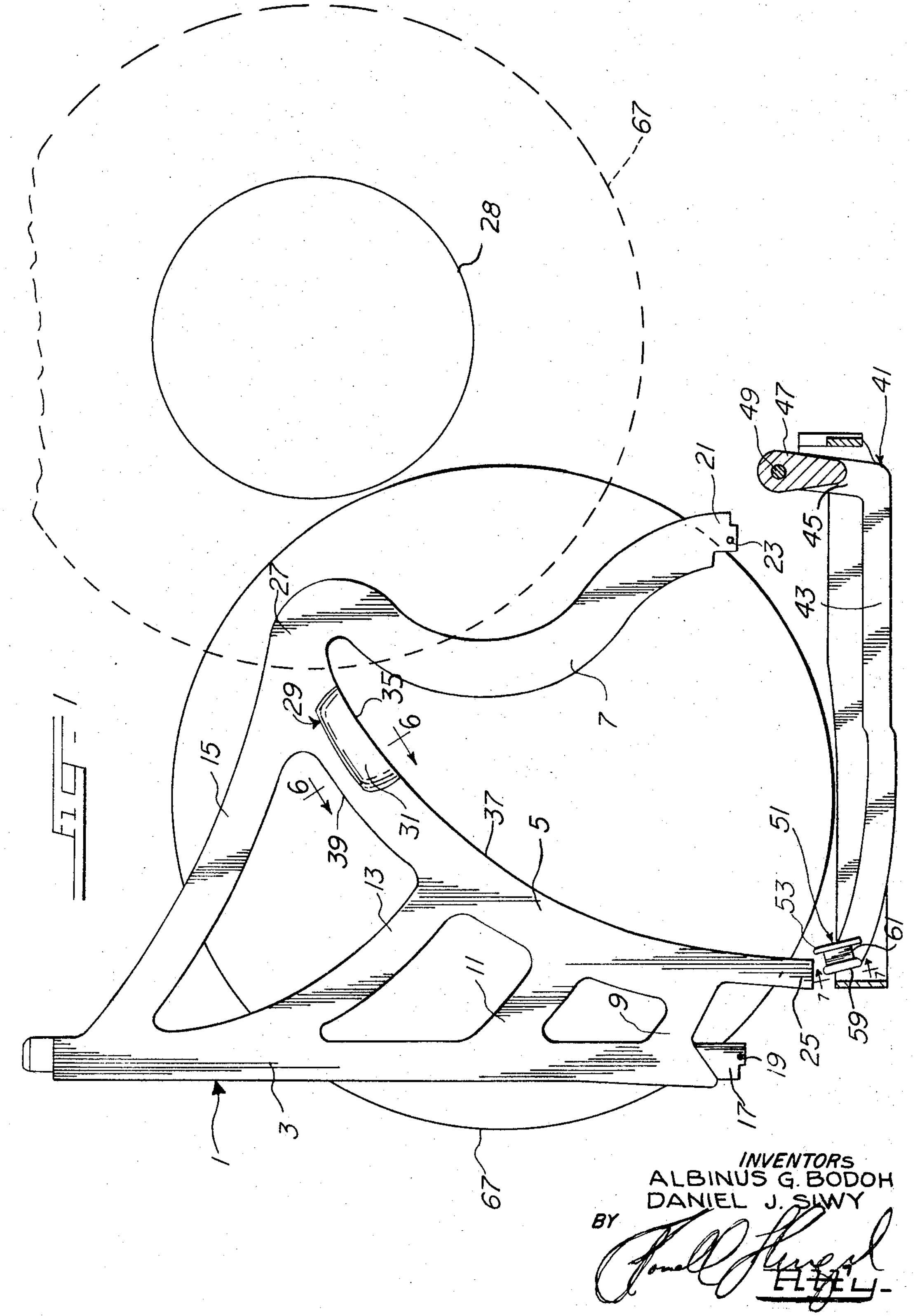
FIGURE 1 is a schematic side view of a record separator and the transfer arm utilized in the subject invention.

With reference to FIGURE 1, a record separator 1 is illustrated. Separator 1 includes a straight vertical section 3, an arcuate section 5, a curvilinear section 7, and interconnecting web portions 9, 11, 13 and 15. The vertical section 3 is provided with a mounting portion 17 at the lowermost end thereof. Mounting portion 17 is secured to a frame of the storage magazine at opening 19 in a conventional manner described below. A similar mounting portion 21 is provided at the lowermost end of curvilinear section 7 and is secured to the magazine frame in a conventional manner at opening 23, as described below.

Arcuate section 5 has a lower end 25 in the same general region as mountinug portions 17 and 21 of vertical sections 3 and curvilinear section 7, respectively, and an upper end 27 which merges with curvilinear section 7 and web portion 15. A phonograph turntable 28 is positioned closely adjacent end 27 of arcuate section 5. In the particular environment in which the embodiment described herein is utilized, turntable 28 is part of a movable selector mechanism which passes back and forth in a track near the storage chambers formed by the record separators. However, turntable 28 could just as well be a stationary turntable in an arrangement wherein the record magazine is moved relative to the turntable. In any event, end 27 of arcuate section 5 is closely adjacent turntable 28 when a record on either side of a particular separator 1 is to be placed, although end 27 of a particular separator is not necessarily close to turntable 28 at all times.

A raised portion 29 is formed on arcuate section 5 of separator 1 adjacent end 27. Raised portion 29 forms a protrusion 31 on the side of separator 1 toward the viewer (as seen in FIGURE 1). A similar protrusion 33 is formed on the side opposite the viewer, as may be seen from FIGURE 6. The FIGURE 6 cross-sectional view more clearly illustrates the structure of raised portions 29 of a pair of adjacent separators. From this FIGURE 6 view, it may be seen that each raised portion 29 has a terminal edge 35 coinciding with edge 37 of arcuate section 5. At its other end, raised portion 29 is tapered to a thickness coresponding to the thickness of the other portions of separator 1, as indicated by edge 39 of arcuate section 5.

In FIGURE 1, a transfer arm 41 is shown in an inactivated position at the bottom of separator 1. Transfer arm 41 has an extended portion 43 and a short arm 45 at right angles to the extended portion 43. Arm 45 is secured to a plate member 47, which is pivoted on an axis 49. At the other end of extending portion 43 there is located a transfer head 51. Transfer head 51 is a unitary structure that may be best visualized by reference to FIGURE 7 in conjunction with the FIGURE 1 illustration.

Transfer head 51 comprises a member 53 having a pair of V-shaped grooves 55 and 57, a spreader 59, and a body member 61 interconnecting member 53 and spreader 59. Transfer head 51 is formed completely of a rigid plastic material. Transfer arm 41 is formed from a rigid metallic material and is relatively thin. Transfer head 51 is connected to the extending portion 43 of transfer arm 41 by rivets 63 and 65 which extend through body portion 61 and extending portion 43. Spreader 59 traverses an arcuate path between arcuate sections 5 of adjoining separators 1, as may best be seen from the FIGURE 1 view, although only one separator is visible. Member 53 traverses an arc parallel to the arcuate sections of adjoining separators 1 as does spreader 59. Groove 55 of member 53 engages a record that is to be removed from or returned to a chamber formed by adjoining separators 1.

When it is desired to play a record, such as that shown at 67, appropriate mechanism (not shown) will be actuated to cause transfer arm 41 to rotate in a clockwise direction (in the FIGURE 1 disposition). Rotation of transfer arm 41 will cause groove 55 of member 53 to engage an edge of record 67. Transfer arm 41 will be rotated until record 67 is positioned on the turntable 28, as shown in dotted lines in FIGURE 1. After the record 67 has been positioned on turntable 28, transfer arm 41 is rotated back a short distance in a counterclockwise direction. The amount of counterclockwise rotation of transfer arm 41 is just enough to position spreader 59 between protrusion 31 of one separator and protrusion 33 on an adjoining separator. With spreader 59 positioned between the protrusions on adjoining separators, the separators are forced apart and the part of record 67 that passes between these separators during play of the record has considerable leeway for displacements, which may occur as a result of warping of the record or as a result of any other factor causing the perimeter of the record being played to depart from a central plane. After the audio signals recorded on record 67 have been reproduced, transfer arm 41 is rotated a short distance in the clockwise direction so that groove 55 will again engage the edge of record 67. Transfer arm 41 is returned to its stored position and transfer arm 41 is returned to the rest position shown in FIGURE 1.

Figure 2:
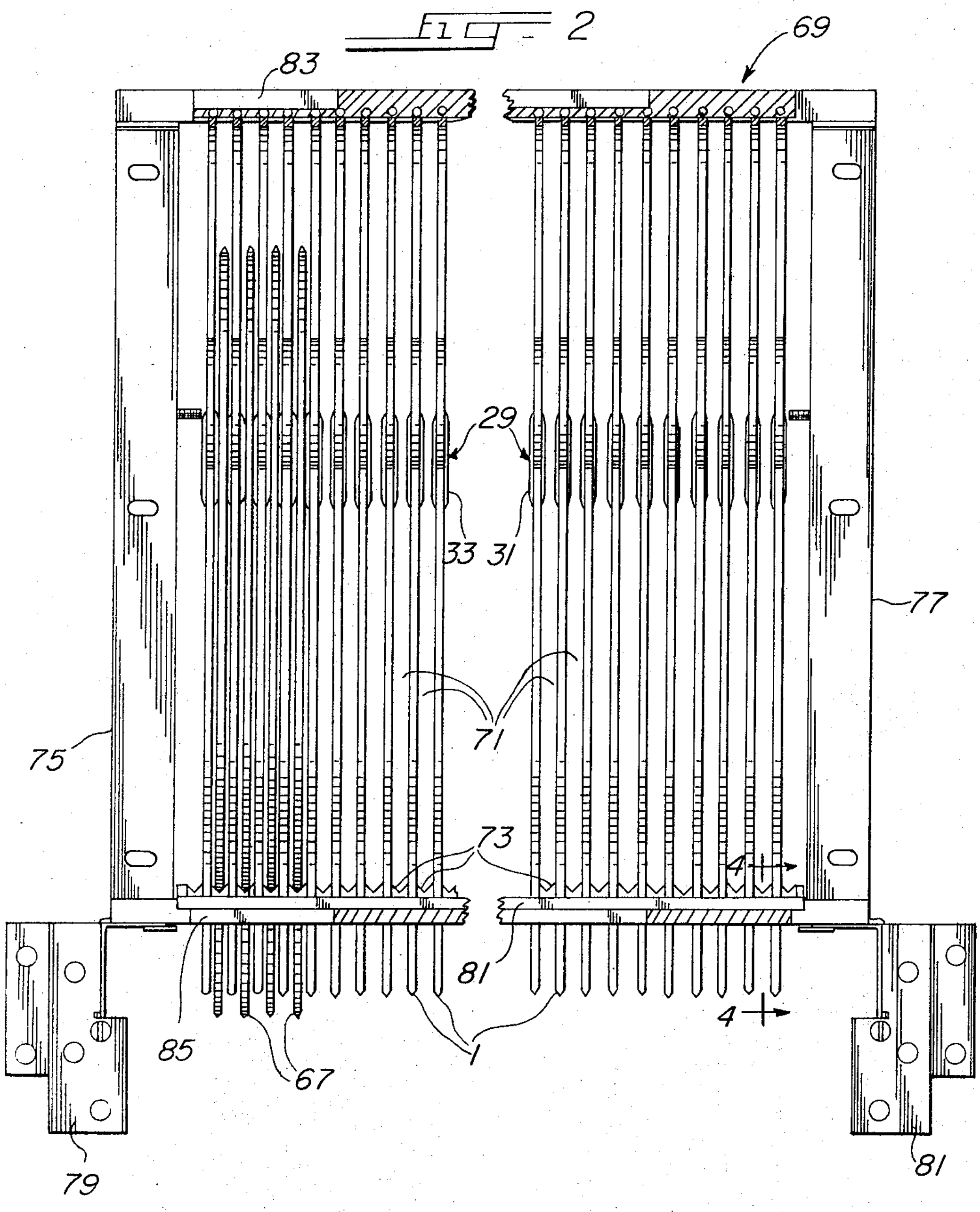
FIGURE 2 is a fragmentary front view of the phonograph record storage magazine of the subject invention with records positioned in some of the storage chambers of the magazine.

In FIGURE 2, a record storage magazine 69 is shown. A plurality of record separators 1 are arranged in a parallel alignment with each separator 1 being uniformly spaced from a separator 1 on either side of it. Each separator 1, except the separators at the very ends of the magazine, is included in two pairs of separators, one with the separator on each side of it, and each pair of separators forms a storage chamber 71. At the bottom front of each storage chamber 71 there is positioned a V-shaped supporting pad 73. A V-shaped support (not shown) is also provided at the back of each storage chamber 71. These V-shaped pads support records in the storage chambers, as shown for records 67.

Magazine 69 may be constructed to have as many separators 1 and hence as many storage chambers 71 as desired. Frame sections 75 and 77 of the magazine frame are illustrated at either end of the plurality of separators 1 that form magazine 69. Frame members 75 and 77 are shown supported by mounting brackets 79 and 81 respectively.

When the phonograph is in use, the records are defined by numbers, letters, or combinations of numbers and letters. These designations of the individual records are achieved in the magazine by placing appropriate designating strips 83 and 85 along sections provided for this purpose. Designation strip 85 is located on a section of the frame 87 that provides a supporting structure for mounting portion 21 of record separators 1.

The mounting arrangement of mounting portion 21 of a separator 1 is illustrated in FIGURE 4, wherein it may be seen that mounting portion 21 is affixed to frame section 87 by an appropriate fastening means 89, such as a bolt or a rivet, through opening 23. Also, shoulders 91 and 93 of mounting portion 21 are appropriately seated on supporting portions 95 and 97 respectively of frame section 87.

The top view of FIGURE 3 serves to further clarify the construction of record storage magazine 69. At the back of magazine 69 there may be seen a frame structure 99. Frame structure 99 serves as a supporting member for mounting portions 17 of separators 1. This mounting arrangement may be better understood by reference to FIGURE 5. There it may be seen that mounting portion 17 is affixed to frame structure 99 by an appropriate connector 101, such as a bolt or rivet, through opening 19. Further, shoulders 103 and 105 are appropriately seated on supporting portions 107 and 109, respectively, on frame section 99.

The operation of the phonograph will now be described with reference to the preferred embodiment shown in the accompanying drawings. When a customer makes a selection, a selector mechanism (not shown) will move transfer arm 41 under the appropriate record 67. Transfer arm 41 will then be rotated by the mechanism to place the selected record 67 on turntable 28. Transfer arm 41 is then rotated back a short distance in order to place spreader 59 between the protrusion 33 of a record separator 1 on the other side of the selected record 67. This forces the separators on either side of the selected record apart so that there is ample room between the separators for the portion of the record that passes between the separators as the record is played, even if the record should be warped or otherwise caused to vary from a central plane. Thus, the separators may be relatively closely spaced to form a compact record storage magazine, and the space for a portion of a record that passes between the separators during play of the record is increased.

It should be understood that the embodiment described is merely exemplary of the preferred practices of the present invention and that various changes, modifications, and variations may be made in the arrangements, operations, and details of construction of the elements disclosed herein without departing from the spirit and scope of the present invention, as defined in the appended claims.

What is claimed is:

1. A record storage and playing arrangement for a phonograph having a turntable comprising:

a storage magazine comprising a plurality of record separators;

means providing a thickened portion in a specified area of each of said separators to provide a protrusion on each of two main sides thereof;

a storage chamber for an individual record formed by an adjoining pair of said record separators;

movable transfer means for removing records from said storage magazine and returning records to said storage magazine; and spreader means operatively associated with said transfer means, said spreader means adapted to be positioned, when said individual record is being played, between a pair of said protrusions, each of said protrusions in said pair of protrusions being on a separate one of said pair of separators forming said storage chamber;

whereby said pair of separators is forced apart in order not to contact and damage said record when it is being played.

2. An arrangement as claimed in claim 1 wherein said record separators are formed of molded plastic.

3. An arrangement as claimed in claim 1 wherein:

each of said separators has an arcuate section containing said thickened portion;

said arcuate section has a first end adjacent the bottom of said storage magazine and a second end adjacent the phonograph turntable; and said thickened portion is formed adjacent said second end of said arcuate section.

4. An arrangement as claimed in claim 3 wherein:

each of said separators is fixedly connected at two points adjacent the bottom of said storage magazine at a uniform spacing with respect to the immediately contiguous separators on either side thereof;

said uniform spacing is sufficiently large to permit the entry of said spreader means; and said spreader means follows an arcuate path along said arcuate section.

5. An arrangement as claimed in claim 1 wherein:

said transfer means comprises a transfer arm and a transfer head member having a V-shaped groove to engage a record to be removed from or returned to said storage magazine; and said spreader means comprises a solid member having tapered ends which is positioned on said transfer head member adjacent to said V-shaped groove.

6. An arrangement as claimed in claim 5 wherein:

each of said separators has an arcuate section containing said thickened portion;

said arcuate section has a first end adjacent the bottom of said storage magazine and a second end adjacent the phonograph turntable;

said thickened portion is formed adjacent said second end of said arcuate section;

each of said separators is fixedly connected to two points adjacent the bottom of said storage magazine at a uniform spacing with respect to the immediately contiguous separators on either side thereof;

said uniform spacing is sufficiently large to permit the entry of said spreader means;

said transfer head member follows an arcuate path along said arcuate section; and said transfer head member is located at the extreme end of said transfer arm in such a manner that said spreader means is positioned between said pair of separators, while said V-shaped groove is not positioned between said pair of separators, as said transfer head member follows said arcuate path.

7. An arrangement as claimed in claim 1 wherein said transfer means moves beyond said pair of protrusions on said pair of separators to position said individual record on the phonograph turntable, and then returns to position, said spreader means between said pair of protrusions on said pair of separators.

No references cited.

DAVID J. WILLIAMOWSKY, *Primary Examiner.*

J. L. KOHNEN, *Assistant Examiner.*